US009822603B2

(12) United States Patent
Whitby (10) Patent No.: US 9,822,603 B2
(45) Date of Patent: Nov. 21, 2017

(54) SUBSEA EQUIPMENT VISUAL INDICATOR (71) Applicant: CAMERON INTERNATIONAL CORPORATION, Houston, TX (US)

(72) Inventor: Ross Whitby, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/984,591

(22) Filed: Dec. 30, 2015

(65) Prior Publication Data

US 2017/0191338 A1 Jul. 6, 2017

(51) Int. Cl.
| *E21B 33/06* | (2006.01) |
| *E21B 33/064* | (2006.01) |
| *E21B 47/001* | (2012.01) |
| *E21B 47/00* | (2012.01) |
| *G01D 11/28* | (2006.01) |

(52) U.S. Cl.
CPC .......... *E21B 33/064* (2013.01); *E21B 33/062* (2013.01); *E21B 47/0001* (2013.01); *G01D 11/28* (2013.01)

(58) Field of Classification Search
CPC .. E21B 33/062; E21B 33/064; E21B 47/0001; G01D 11/28
See application file for complete search history.

(56) References Cited

U.S. PATENT DOCUMENTS

| 1,386,065 | A | * | 8/1921 | Lofton | F16K 37/0008 116/277 |
| 4,406,303 | A | * | 9/1983 | Kilmoyer | F16K 37/0008 137/552 |
| 6,427,576 | B1 | * | 8/2002 | Bock | F15B 15/2807 92/5 R |
| 6,898,968 | B2 | * | 5/2005 | Biester | E21B 33/06 73/168 |
| 7,023,199 | B2 | * | 4/2006 | Blubaugh | F15B 15/2892 324/207.13 |
| 7,302,842 | B2 | * | 12/2007 | Biester | E21B 33/06 73/161 |
| 7,437,988 | B2 | * | 10/2008 | Andersson | F15B 15/2892 92/169.1 |
| 9,103,459 | B2 | * | 8/2015 | Borchgrevink | F16K 37/0008 |
| 2008/0040070 | A1 | * | 2/2008 | McClanahan | E21B 33/062 702/158 |
| 2012/0000646 | A1 | * | 1/2012 | Liotta | E21B 33/062 166/85.4 |
| 2012/0001101 | A1 | * | 1/2012 | Dietz | E21B 33/062 251/1.3 |
| 2013/0146793 | A1 | * | 6/2013 | Gustafson | E21B 33/062 251/1.3 |

* cited by examiner

*Primary Examiner* — Matthew R Buck
(74) *Attorney, Agent, or Firm* — Conley Rose, P.C.

(57) ABSTRACT

A position indicator for a subsea component of a well system includes a visual indicator including an illuminator, an electrical connector selectably connected between the visual indicator and a power supply, and an actuator configured to connect the visual indicator with the power supply when a moveable member of the subsea component is disposed in a first position, wherein the illuminator is configured to emit a first subsea illumination when the moveable member is disposed in the first position.

14 Claims, 6 Drawing Sheets

SUBSEA EQUIPMENT VISUAL INDICATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Hydrocarbon drilling systems utilize drilling fluid or mud for drilling a wellbore in a subterranean earthen formation. In some offshore drilling applications, a blowout preventer (BOP) is coupled to a subsea wellhead at or near the sea floor to seal, control, and monitor the drilled wellbore, thereby acting to prevent the uncontrolled release of hydrocarbons from the wellbore and into the subsea environment. In these applications, the subsea BOP may be disposed at a great distance from a drilling rig disposed at the waterline, and may comprise electrical and hydraulic lines, control pods, hydraulic accumulators, and other components for powering and actuating the BOP. In the event of a "blowout" or uncontrolled release of fluid from the wellbore, the BOP and its associated components may be physically compromised or damaged, jeopardizing the actuation of the BOP into a closed position to seal the wellbore from the subsea environment and cease the uncontrolled release of fluid therefrom. In such an event, given the remote location of the BOP relative to the drilling rig, it may be difficult to determine the position of actuatable components of the BOP. In other words, it may be difficult to determine whether particular sealing components of the BOP have been actuated into the closed position when the components powering and controlling the actuation of the BOP have been possibly compromised.

SUMMARY

An embodiment of a position indicator for a subsea component of a well system comprises a visual indicator comprising an illuminator, an electrical connector selectably connected between the visual indicator and a power supply, and an actuator configured to connect the visual indicator with the power supply when a moveable member of the subsea component is disposed in a first position, wherein the illuminator is configured to emit a first subsea illumination when the moveable member is disposed in the first position. In some embodiments, the actuator is configured to disconnect the power supply from the visual indicator when the moveable member is disposed in a second position distal the first position. In some embodiments, the visual indicator and the actuator are disposed in a housing coupled to the subsea component. In certain embodiments, the position indicator further comprises a biasing member extending between the visual indicator and the power supply, wherein the biasing member is configured to bias the position of the power supply into a position disconnected from the visual indicator. In certain embodiments, the actuator comprises a piston that engages the moveable member and the power supply when the moveable member is in the first position to connect the power supply to the visual indicator. In some embodiments, the piston compresses the biasing member when the moveable member is in the first position to connect the power supply to the visual indicator. In some embodiments, the position indicator further comprises a controller connected between the visual indicator and the power supply, wherein the controller is configured to control the illumination emitted from the illuminator. In certain embodiments, in response to the moveable member being disposed in a second position distal the first position, the controller is configured to actuate the illuminator such that the illuminator emits a second subsea illumination. In certain embodiments, the first subsea illumination comprises a first color, and the second subsea illumination comprises a second color. In some embodiments, the subsea component comprises a blowout preventer, and the moveable member comprises a piston disposed in a cylinder of the blowout preventer.

An embodiment of a blowout preventer comprises a cylinder including a closure piston disposed slidably therein, a closure member coupled to the closure piston, wherein the closure member is configured to allow for fluid communication through a bore of the blowout preventer when the closure piston is disposed in a first position, and to seal the bore when the closure piston is disposed in a second position distal the first position, and a position indicator coupled to the cylinder comprising a visual indicator, and an actuator configured to actuate the visual indicator when the closure piston is in the first position such that the visual indicator provides a first visual indication. In some embodiments, the first visual indication comprises a first illumination emitted from the visual indicator. In some embodiments, the actuator is configured to restrict a power supply from supplying the visual indicator with power when the closure piston is disposed in a second position distal the first position. In certain embodiments, the blowout preventer further comprises a biasing member extending between the visual indicator and the power supply, wherein the biasing member is configured to bias the position of the power supply such that the power supply is prevented from supplying power to the visual indicator. In certain embodiments, the actuator comprises an indicator piston that engages the closure piston when the closure piston is in the first position to connect a power supply to the visual indicator. In certain embodiments, the visual indicator comprises a mechanical display.

An embodiment of a method of indicating a position of a closure member of a blowout preventer comprises providing a first subsea illumination from a visual indicator when the closure member is disposed in a first position, and ceasing the first subsea illumination from the visual indicator in response to the closure member being displaced from the first position. In certain embodiments, the method further comprises detecting the first subsea illumination from the visual indicator using a remotely operated underwater vehicle. In certain embodiments, the method further comprises providing a second subsea illumination from the visual indicator when the closure member is disposed in a second position distal the first position. In some embodiments, the method further comprises providing a third subsea illumination from the visual indicator when the closure member is disposed in a third position between the first position and the second position.

BRIEF DESCRIPTION OF THE DRAWINGS

For a detailed description of exemplary embodiments, reference will now be made to the accompanying drawings in which.

DETAILED DESCRIPTION

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 1:
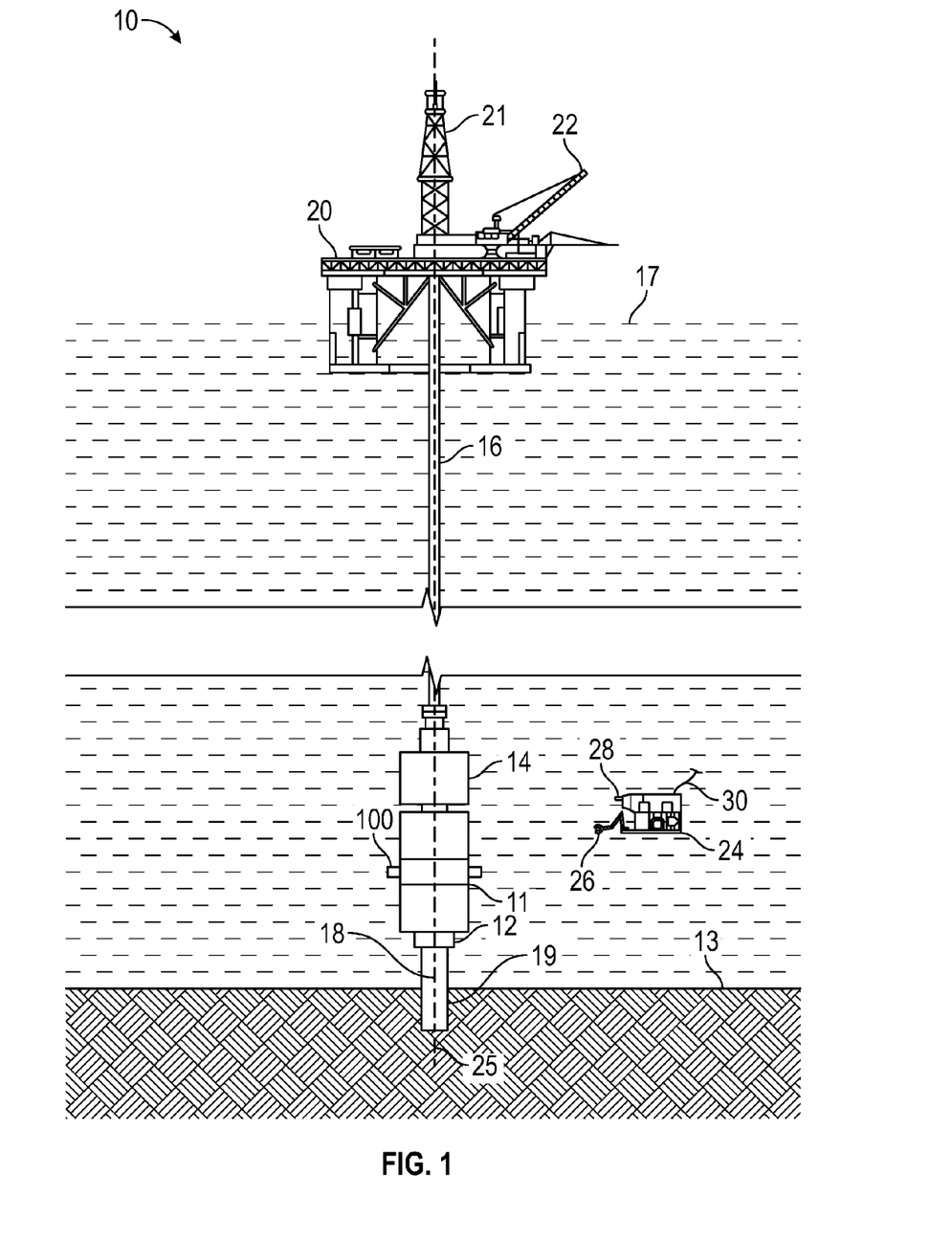
FIG. 1 is a schematic view of an embodiment of an offshore well system for drilling and/or production of hydrocarbons in accordance with principles disclosed herein.
Figure 2:
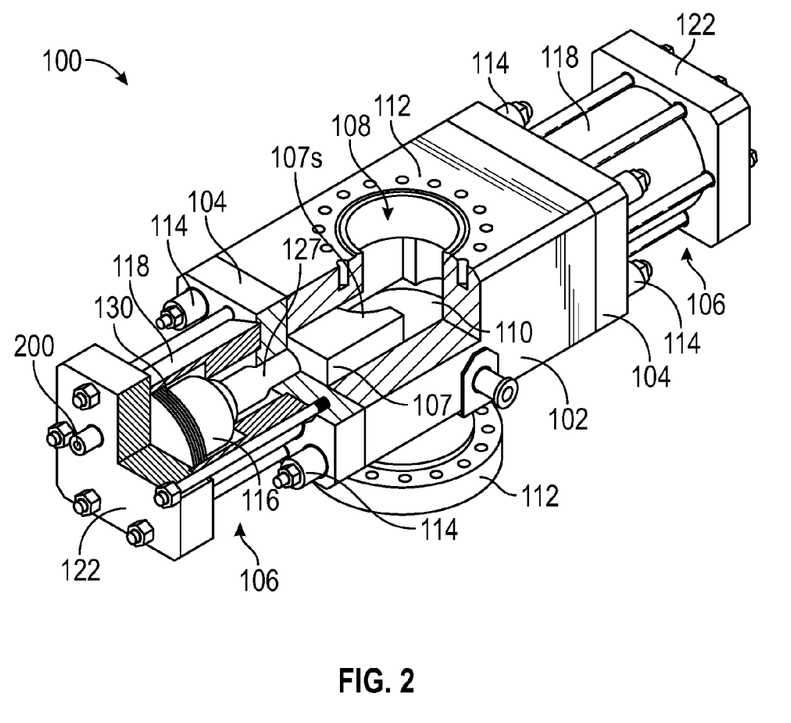
FIG. 2 is a cross-sectional perspective view of an embodiment of a ram BOP of the well system of FIG. 1.

Referring now to FIG. 1, an embodiment of an offshore system 10 for drilling and/or producing a subsea well is shown. In this embodiment, system 10 includes a subsea blowout preventer (BOP) stack 11 mounted to a wellhead 12 at the sea floor 13. Stack 11 includes a ram 100 attached to the upper end of wellhead 12 and a lower marine riser package (LMRP) 14 connected to the upper end of BOP stack 11. A marine riser 16 extends from a surface vessel 20 at the sea surface or waterline 17 to LMRP 14. In this embodiment, vessel 20 is a floating platform, and thus, may also be referred to as platform 20. In other embodiments, the vessel (e.g., vessel 20) can be a drill ship or any other vessel disposed at the sea surface for conducting offshore drilling and/or production operations. Platform 20 includes a drilling derrick 21 and a lifting device 22. Riser 16 is a large-diameter pipe that connects LMRP 14 to floating platform 20. During drilling operations, riser 16 takes mud returns to platform 20. Further, riser 16 is coupled to electrical and hydraulic lines (not shown) for powering and controlling the actuation of components of BOP stack 11, including a subsea component or ram BOP 100. A primary conductor 18 extends from wellhead 12 into the subterranean wellbore 19. BOP stack 11, LMRP 14, wellhead 12, and conductor 18 are arranged such that each shares a common central axis 25. In other words, BOP stack 11, LMRP 14, wellhead 12, and conductor 18 are coaxially aligned. In addition, BOP stack 11, LMRP 14, wellhead 12, and conductor 18 are vertically stacked one-above-the-other, and the position of platform 20 is controlled such that axis 25 is vertically or substantially vertically oriented.

In this embodiment, offshore system 10 also includes a remotely operated underwater vehicle (ROV) 24 disposed below the waterline 17 and including an actuatable arm or gripper 26, a camera or image sensor 28, and a cable 30 that supplies power and signal communications between ROV 24 and the floating platform 20. Gripper 26 is configured to actuate particular components of LMRP 14 and BOP stack 11 while images and/or video captured by camera 28 may be communicated in real time to the floating platform 20 via cable 30. In this configuration, personnel of floating platform 20 may visually observe BOP stack 11, LMRP 14, wellhead 12, and other subsea components of offshore system 10 in real time utilizing ROV 24. While in this embodiment, ROV 24 is connected to the surface platform 20 via a cable 30 that supplies power and signal communication between ROV 24 and floating platform 20. However, in other embodiments, ROV 24 may be untethered from floating platform 20 and comprising an internal power supply and an antenna for wirelessly transmitting signals to the floating platform 20. In still further embodiments, ROV 24 may comprise an autonomous or semi-autonomous vehicle.

Referring to FIGS. 2-5, in this embodiment the ram BOP 100 of BOP stack 11 generally includes a body 102, bonnets 104, ram assemblies 106, and closure members or ram blocks 107. The body 102 of ram BOP 100 generally includes a central bore 108 disposed coaxially with central axis 25, opposed cavities 110, and upper and lower bolted connections 112 for coupling ram BOP 100 with other components of BOP stack 11. The bonnets 104 of ram BOP 100 are coupled to the body 102 by connectors 114 that allow the bonnets to be removed from the body to provide access to the closure members 17. Each ram assemblies 106 is mounted to a corresponding bonnet 104 and includes a moveable member or hydraulic closure piston 116 slidably disposed within a cylinder 118 to actuate the ram block 107 through cavity 110, into and out of central bore 108.

Figure 3:
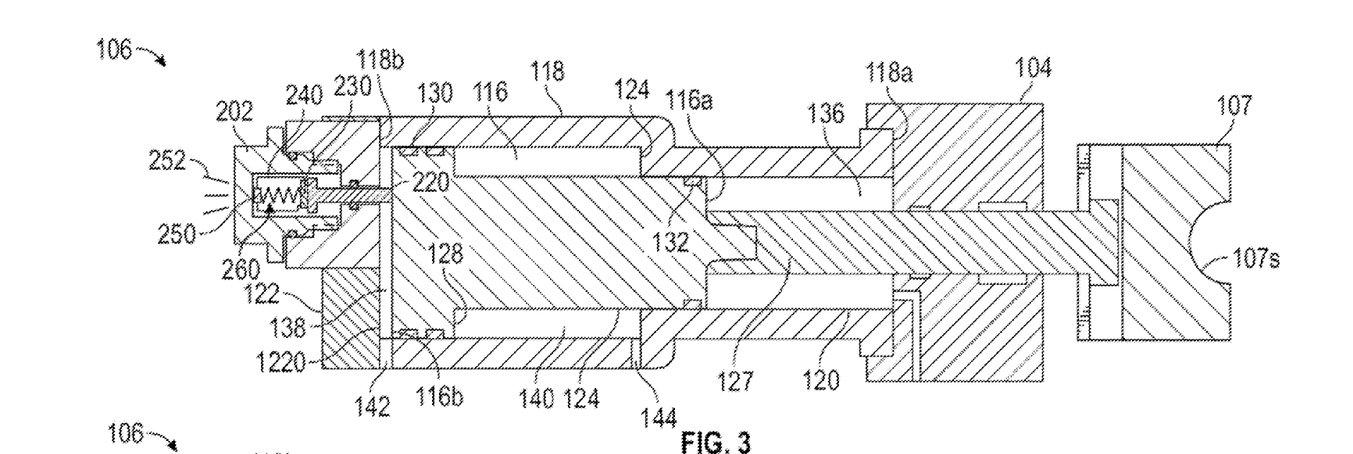
FIG. 3 is a top cross-sectional view of a ram assembly of the ram BOP of FIG. 2 in an open position, in accordance with principles disclosed herein.
Figure 4:
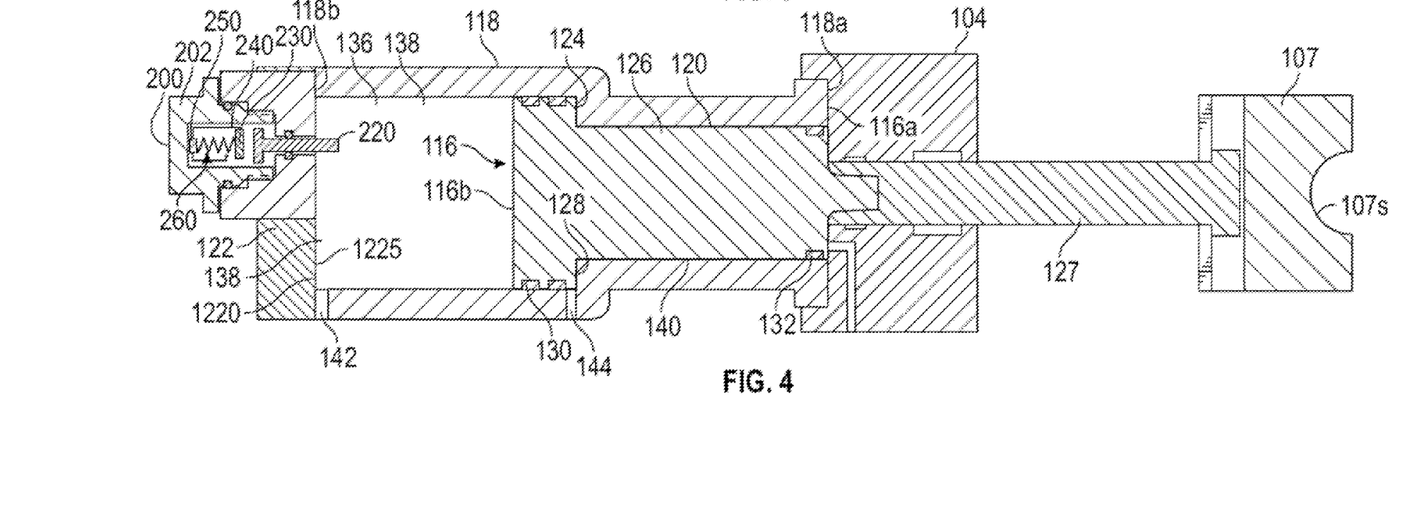
FIG. 4 is a top cross-sectional view of the ram assembly of FIG. 4 in a closed position.

As shown particularly in FIGS. 3 and 4, the cylinder 118 of each ram assembly 106 has a first or inner end 118a, a second or outer end 118b, and a generally cylindrical inner surface 120 extending between the inner end 118a and outer end 118b. In this arrangement, inner end 118a of cylinder 118 couples with and sealingly engages bonnet 104 and outer end 118b couples with and sealingly engages a piston head 122. The inner surface 120 of cylinder 118 includes an annular shoulder 124 facing piston head 122. In this embodiment, piston 116 has a first or inner end 116a, a second or outer end 116b, and a generally cylindrical outer surface 126 extending between inner end 116a and outer end 116b. A connecting rod 127 extends between the inner end 116a of piston 116 and an outer end of ram block 107, thereby coupling piston 116 to ram block 107. The outer surface 124 of piston 116 includes an annular shoulder 128 that is disposed proximal outer end 116b and faces ram block 107. The outer surface 124 of piston 116 also includes a pair of outer annular seals 130 disposed proximal outer end 116b and an inner annular seal 132 disposed proximal inner end 116a, where both outer annular seals 130 and inner annular seal 132 are configured to sealingly engage the inner surface 120 of cylinder 118.

A chamber 136 is formed within cylinder 118 which is defined by the inner surface 120 of cylinder 118. Chamber 136 is divided into a first or outer section 138 that extends between an inner surface 122i of piston head 122 and outer annular seals 130, and a second or inner section 140 that extends between outer annular seals 130 and inner annular seal 132. Outer section 138 is in fluid communication with an outer passage 142 and inner section 140 is in fluid communication with inner passage 144, where outer passage 142 and inner passage 144 each extend through cylinder 118.

In the arrangement described above, the pumping of hydraulic fluid into the outer section 138 of chamber 136 via outer passage 142 acts to shift piston 116 from a first or open position shown in FIG. 3 to a second or closed position shown in FIG. 4. Particularly, fluid pumped into outer section 138 applies a pressure force against the outer end 116b of piston 116, displacing piston 116 inwardly through chamber 136 in the direction of bonnet 104 until annular shoulder 128 of piston 116 engages annular shoulder 124 of cylinder 118, thereby restricting any further inward motion of piston 116 within chamber 136. Contradistinctively, pumping hydraulic fluid into the inner section 140 of chamber 136 via inner passage 144 shifts piston 116 from the closed position shown in FIG. 4 to the open position shown in FIG. 3. Particularly, fluid pumped into inner section 140 applies a pressure force against the annular shoulder 128 of piston 116, displacing piston outwardly 116 through chamber 136 in the direction of piston head 122 until the outer end 116b of piston 116 is disposed adjacent or engages the inner surface 122i of piston head 122.

In the closed position of piston 116 shown in FIG. 3, a sealing surface 107s of ram block 107 is configured to sealingly engage and outer surface of a tubular or drill pipe (not shown) extending through the central bore 108 (shown in FIG. 2) of ram BOP 100, thereby sealing or restricting the passage of fluid through central bore 108. On the other hand, when piston 116 is in the open position shown in FIG. 3, sealing surface 107s of ram block 107 is disposed distal the outer surface of the tubular disposed in central bore 108, allowing for the passage of fluid through central bore 108.

Figure 5:
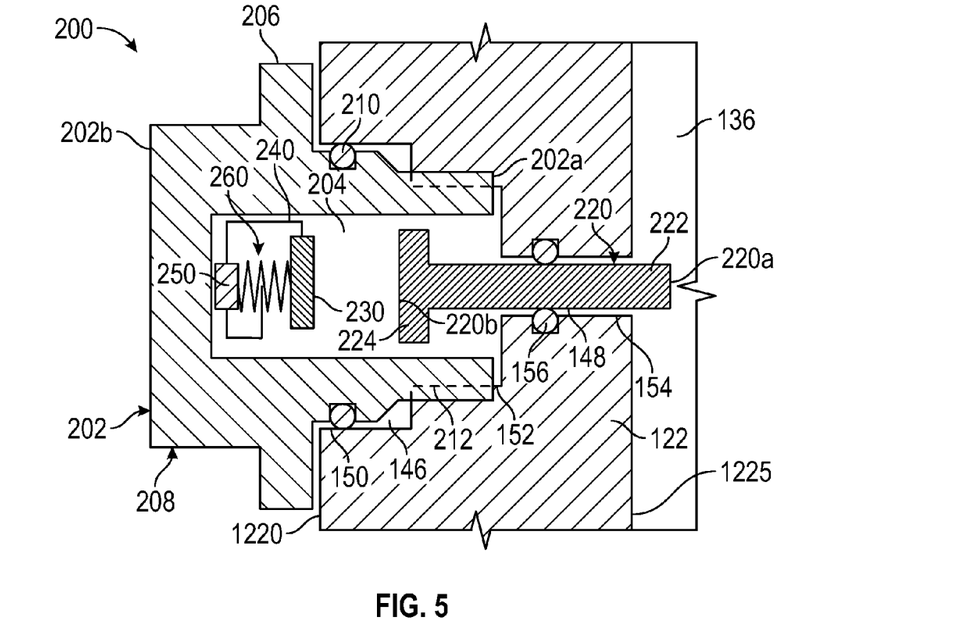
FIG. 5 is a schematic cross-sectional view of an embodiment of a position indicator assembly of the ram assembly of FIG. 4 in accordance with principles disclosed herein.
Figure 6:
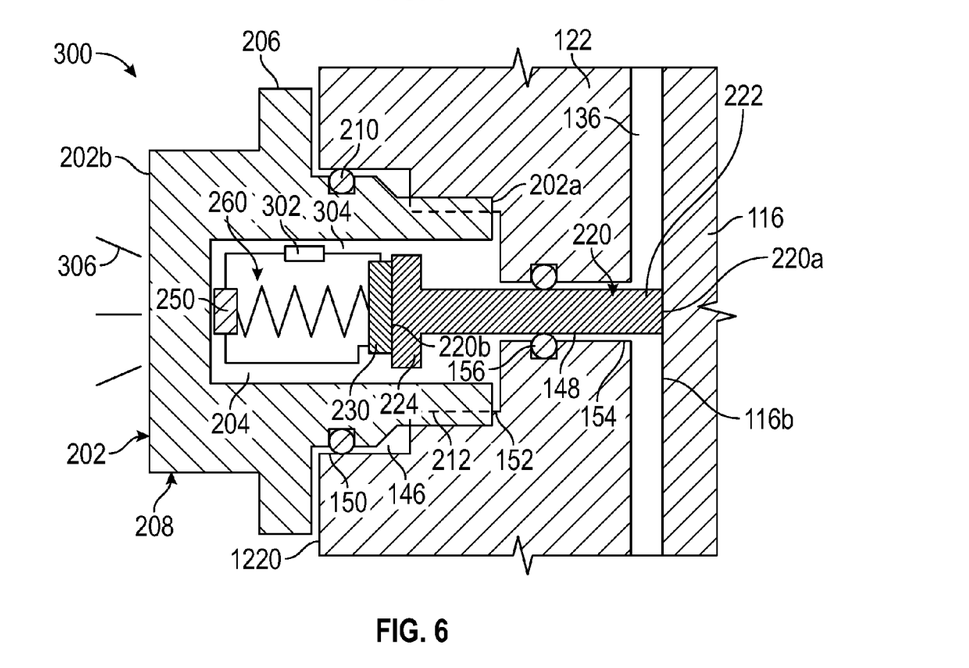
FIG. 6 is a schematic cross-sectional view of another embodiment of a position indicator assembly of the ram assembly of FIG. 4, shown in a first position, in accordance with principles disclosed herein.

As shown particularly in FIGS. 3-5, ram BOP 100 includes a position indicator assembly 200 generally configured to indicate the position of piston 116 within chamber 136, and in turn, the position of ram block 107 within central bore 108. Although in this embodiment position indicator assembly 200 is utilized in conjunction with ram BOP 100, in other embodiments, position indicator assembly 200 may be utilized in conjunction with other subsea components of offshore system 10. Moreover, position indicator assembly 200 may be utilized in other well systems, including land-based well systems.

In this embodiment, position indicator assembly 200 generally includes a housing 202, an indicator piston 220, a power supply 230, an electrical connector or circuit 240, a visual indicator 250, and a biasing member 260. In this embodiment, piston head 122 includes a receptacle 146 extending into piston head 122 from an outer surface 122o of piston head 122, and a piston passage 148 extending between the receptacle 146 and the inner surface 122i of piston head 122. Receptacle 146 includes a generally cylindrical inner surface 150 having a threaded connector 152 extending over a portion of the inner surface 150 to threadably connect with a corresponding connector of position indicator assembly 200. Piston passage 148 also includes a generally cylindrical inner surface 154 configured to slidably engage indicator an actuator or indicator piston 220 of position indicator assembly 200. Further, the inner surface 154 of piston passage 148 includes an annular seal 156 disposed therein for sealingly engaging an outer surface of indicator piston 220.

Housing 202 is configured to be received in receptacle 146 of piston head 122 and comprises a transparent or semi-transparent material configured for use in high pressure environments to allow for a visual indication provided by visual indicator to be identified externally of housing 202, such as by the camera 28 of ROV 24. In this embodiment, housing 202 comprises a high strength clear polymer material; however, in other embodiments, housing 202 may comprise a high strength acrylic, or a high strength glass sight window with a metal housing. Housing 202 includes a first or inner end 202a, a second or outer end 202b, and a bore 204 extending into housing 202 from inner end 202a. Bore 204 of housing 202 is configured to receive the indicator piston 220, power supply 230, circuit 240, visual indicator 250, and biasing member 260. Although in this embodiment position indicator assembly 200 is coupled to piston head 122 of ram assembly 106, in other embodiments, position indicator assembly 200 may be coupled to other components of ram assembly 106, such as cylinder 118 or bonnet 104.

In this embodiment, housing 202 includes an outer surface 206, where a portion of outer surface 206 includes a hexagonal shaped portion 208 proximal outer end 202b for conveniently gripping housing 202 when coupling or removing housing 202 from piston head 122. The outer surface 206 of housing 202 also includes an annular seal 210 for sealingly engaging the inner surface 150 of receptacle 146 and a threaded connector 212 disposed at the inner end 202a of housing 202 for threadably connecting with the threaded connector 152 of receptacle 146. In this arrangement, housing 202 may be threadably or releasably coupled to piston head 122. Further, the sealing engagement provided by annular seal 210 isolates bore 204 from the surrounding environment while the sealing engagement provided by annular seal 156 isolates bore 204 from chamber 136 of cylinder 118.

Power supply 230 of position indicator assembly 200 is configured to supply electrical power to visual indicator 250 when position indicator assembly 200 is disposed in an "on" or illuminated position. In this embodiment, power supply 230 comprises a battery, such as a lithium battery; however in other embodiments, power supply 230 may comprise other suitable mechanisms known in the art for providing energy to visual indicator 250. Power supply 230 is selectably connected to visual indicator 250 via circuit 240. Specifically, when position indicator assembly 200 is in the on position the circuit 240 provides an electrical connection or "complete circuit" between power supply 230 and visual indicator 250 (i.e., connects power supply with visual indicator 250), causing visual indicator 250 to emit a visual indication or illumination 252 (shown in FIG. 3) that may pass through housing 202 and be externally detected, such as by the camera 28 of ROV 24. Contradistinctively, when position indicator assembly 200 is in an "off" or unilluminated position (shown in FIG. 4), an electrical connection is not provided between power supply 230 and visual indicator 250, or in other words, a circuit is not "completed" between power supply 230 and visual indicator 250, and thus, visual indicator 250 does not give off illumination 252. In certain embodiments, circuit 240 may include components for extending the service life of power supply 230. For instance, in some embodiments circuit 240 includes a joule thief circuit, or alternatively, an LED flasher circuit.

In this embodiment, visual indicator 250 comprises an illuminator 250 for providing visual illumination or light, such as a light-emitting diode (LED); however, in other embodiments, visual indicator 250 may comprise other mechanisms known in the art for selectably providing a visual indication, such as a rotating mechanical display, a split-flap display, and the like In these embodiments, the visual indicator 250 comprises a pair of fixed graphics, with one graphic displaying "OPEN" and the other graphic displaying "CLOSED," and a controller mechanism (e.g., an electric motor or a mechanical mechanism such as a gear assembly, etc.) for controlling the display of the pair of graphics. In this arrangement, the "OPEN" graphic would be visually displaced and the "CLOSED" graphic would be hidden from view by the controller mechanism when piston 116 is disposed in the open position, and the "CLOSED" graphic would be visually displaced and the "OPEN" graphic hidden from view when piston 116 is disposed in the closed position.

In certain embodiments, position indicator assembly 200 is biased into the off position where visual indicator 250 does not emit illumination 252. Particularly, biasing member 260 extends between power supply 230 and visual indicator 250, exerting a biasing force against power supply 230 to thereby displace power supply 230 from visual indicator 250 and disconnect the circuit 240 between power supply 230 and visual indicator 250. In this embodiment, biasing member 260 comprises a coiled spring; however, in other embodiments, biasing member 260 may comprise other mechanisms known in the art for providing a biasing force. In this arrangement, position indicator assembly 200 will remain in the off position unless a force is applied against power supply 230 to compress biasing member 260 and thereby connect the circuit 240 between power supply 230 and visual indicator 250. While in this embodiment the position indicator assembly 200 is biased into the off position, in other embodiments, position indicator assembly 200 may be biased into the on position, with the position indicator assembly 200 being actuatable into the off position in response to a force applied to power supply 230 by an actuator, such as indicator piston 220.

Indicator piston 220 of position indicator assembly 200 is configured to actuate position indicator assembly 200 between the on and off positions in response to movement or displacement of piston 116. Although in this embodiment position indicator assembly 200 includes indicator piston 220, in other embodiments, position indicator assembly 200 may comprise other mechanisms known in the art for controlling the actuation position indicator assembly 200 between the on and off positions. For example, in other embodiments the position indicator assembly 200 may include a sensor for detecting the position of piston 116 and relaying a signal to a controller indicating the detected position of piston 116, where the controller is configured to actuate the visual indicator 250 in response to the position signal outputted by the signal.

In this embodiment, indicator piston 220 has a first or inner end 220a, a second or outer end 220b, and a generally cylindrical outer surface 222 extending between the inner end 220a and the outer end 220b. As mentioned above, the outer surface 222 of indicator piston 220 sealingly engages the annular seal 156 of piston passage 148 to seal or isolate bore 204 of housing 202 from chamber 136. Also, in this embodiment, indicator piston 220 includes a flange or flanged end 224 disposed at outer end 220b for retaining the outer end 220b of piston 220 in bore 204 of housing 202. Specifically, flange 224 of piston 220 has a larger diameter than the diameter of passage 148, preventing the displacement of piston 220 entirely through passage 148 of piston head 122.

As shown particularly in FIGS. 3 and 4, when piston 116 is in the open position (shown in FIG. 3) the outer end 116b of piston 116 engages the inner end 220a of indicator piston 220, forcing indicator piston 220 into an outer position. In the outer position, the outer end 220b of indicator piston 220 engages power supply 230 and compresses biasing member 260, thereby connecting the circuit 240 between power supply 230 and visual indicator 250 and causing visual indicator 250 to emit illumination 252. Upon actuation of piston 116 from the open position shown in FIG. 3 to the closed position shown in FIG. 4, piston 116 is displaced through chamber 136 towards bonnet 104. As piston 116 is displaced through chamber 136, the biasing force provided by biasing member 260 acts to displace power supply 230 and indicator piston 220 in the direction of bonnet 104, disconnecting the circuit 240 between visual indicator 250 and power supply 230, thereby ceasing illumination 252.

Referring to FIGS. 1 and 2-4, in the event of an uncontrolled fluid influx into wellbore 19 components of BOP stack 11, including ram BOP 100, may be actuated into a closed position to isolate fluid within wellbore 19. In some cases, the degree of fluid influx into the wellbore 19 may be of such a degree or rapidity that the physical integrity of subsea components of offshore system 10 may become jeopardized. For example, a rapid influx of fluid into the wellbore 19 may overpressurize the subsea wellhead 12, components of BOP stack 11, or the LMRP 14. In such an event, electrical and/or hydraulic power systems controlling the actuation of subsea components of offshore system 10 may be disrupted, thereby inhibiting or preventing personnel at floating platform 20 from determining the position of those subsea components. For example, in such an event it may be difficult or impossible to determine from floating platform 20 whether ram BOP 100 has successfully actuated into the closed position shown in FIG. 4 to isolate or seal the central bore 108 of ram BOP 100. In such a case, position indicator assembly 200 may be utilized to determine the position of the piston 116 of ram BOP 100 even if other power, control, and monitoring systems have been compromised by a rapid influx of fluid into wellbore 19 or other catastrophic event.

Specifically, in such an event, ROV 24 may be navigated until it is disposed proximal a ram assembly 106 of ram BOP 100. In this position, camera 28 of ROV 24 may be utilized to detect the position of the piston 116 of ram assembly 106 via visual indicator 250. Particularly, in this embodiment, if camera 28 of ROV 24 detects illumination 252 from visual indicator 250, then personnel at floating platform 20 may thereby determine that piston 116 is disposed in the open position and central bore 108 has not been sealed by the sealing surface 107s of ram block 107. However, if the camera 28 of ROV 24 detects no illumination provided by visual indicator 250, then personnel of platform 20 may determine that piston 116 is disposed in the closed position and that sealing surface 107s of ram block 107 has sealingly engaged the outer surface of a tubular extending through central bore 108 of ram BOP 100. In this manner, the position of piston 116 may be determined without relying on any other indication provided by ram BOP 100, such as the fluid pressure in control lines connected with outer passage 142 or inner passage 144. Although in this embodiment position indicator assembly 200 is utilized in conjunction with ram BOP 100, in other embodiments position indicator assembly 200 may be utilized to indicate the position of other components of offshore system 10. For instance, position indicator assembly 200 may be utilized to indicate the position of actuatable or displaceable components of other BOPs of BOP stack 11, or actuatable components of the wellhead 12 or LMRP 14.

Referring to FIGS. 2-4 and 6, FIG. 6 illustrates another embodiment of a position indicator assembly 300 for use with ram BOP 100. Position indicator assembly 300 includes features similar to position indicator assembly 200, and shared features are numbered similarly. In this embodiment, position indicator assembly 300 includes a controller 302 connected to a connector or circuit 304 that connects the power supply 230 with the visual indicator 250. In this embodiment, controller 302 includes memory and a processor and is configured or programmed to control the actuation of visual indicator 250. Further, in this embodiment, power supply 230 remains connected to visual indicator 250 (i.e., the circuit remains "completed") irrespective of the position of piston 116. In this arrangement, controller 302 is configured to actuate visual indicator 250 when piston 116 is in the open position such that visual indicator 250 emits a first illumination 306, and to actuate visual indicator 250 when piston 116 is in the closed position such that visual indicator 250 emits a second illumination 308.

Figure 7:
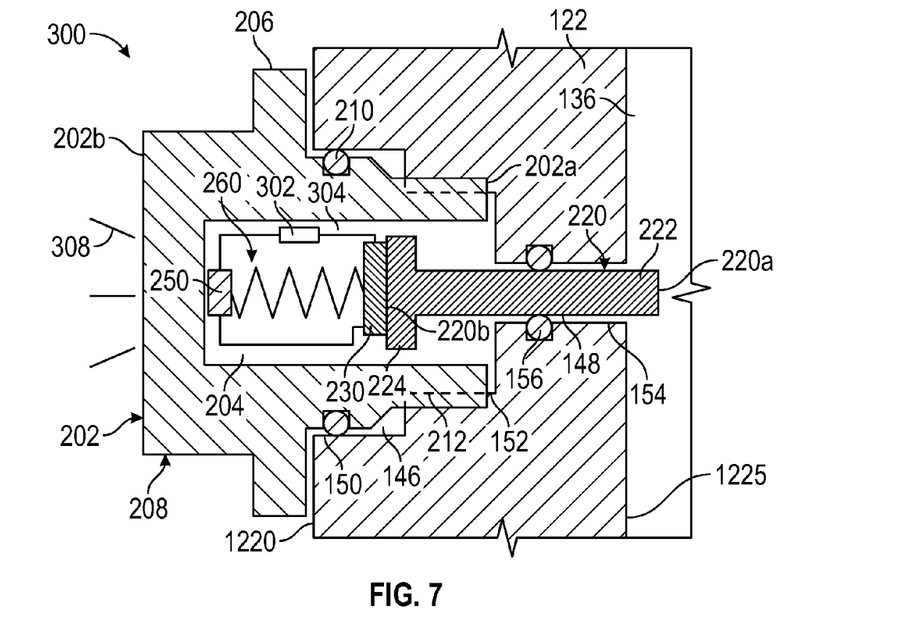
FIG. 7 is a schematic cross-sectional view of the position indicator assembly of FIG. 6, shown in a second position.

In this embodiment, the first illumination 306 comprises a first color, while the second illumination 308 comprises a second color. In this manner, personnel of offshore platform 20 may determine whether piston 116 is in the open or closed position via detecting the first illumination 306 or second illumination 308 using the camera 28 of ROV 24. Further, position indicator assembly 300 may also include a third illumination corresponding with a third color indicating that the piston 116 of ram assembly 106 is disposed in an intermediate position between the open position shown in FIG. 6 and the closed position in FIG. 7. In this arrangement, personnel of offshore platform 20 could diagnose a failure of ram BOP 100 to successfully actuate piston 116 into the closed position by detecting the third illumination utilizing the camera 28 of ROV 24.

Figure 8:
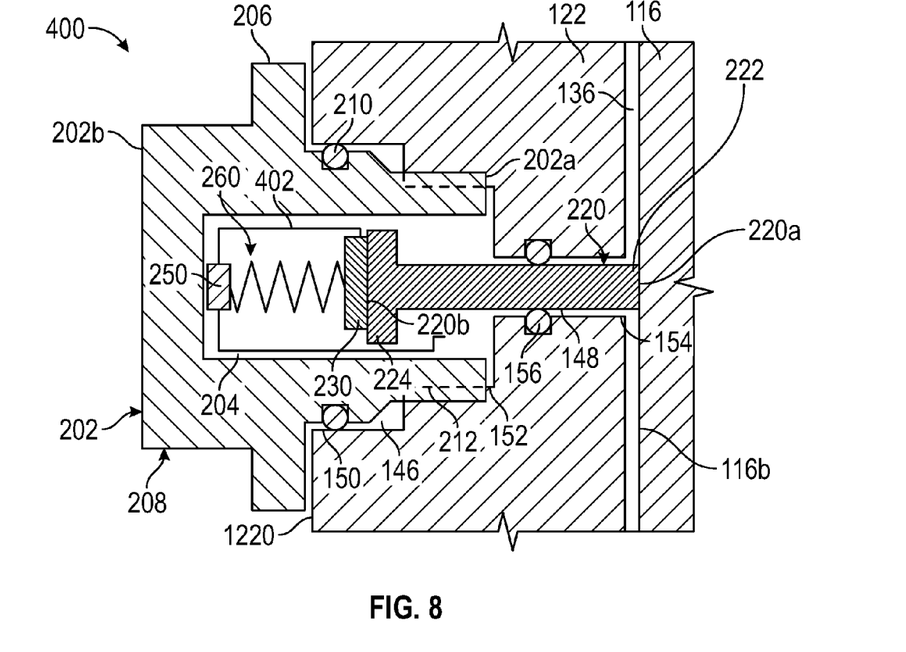
FIG. 8 is a schematic cross-sectional view of another embodiment of a position indicator assembly of the ram assembly of FIG. 4, shown in a first position, in accordance with principles disclosed herein.
Figures 9, 10:
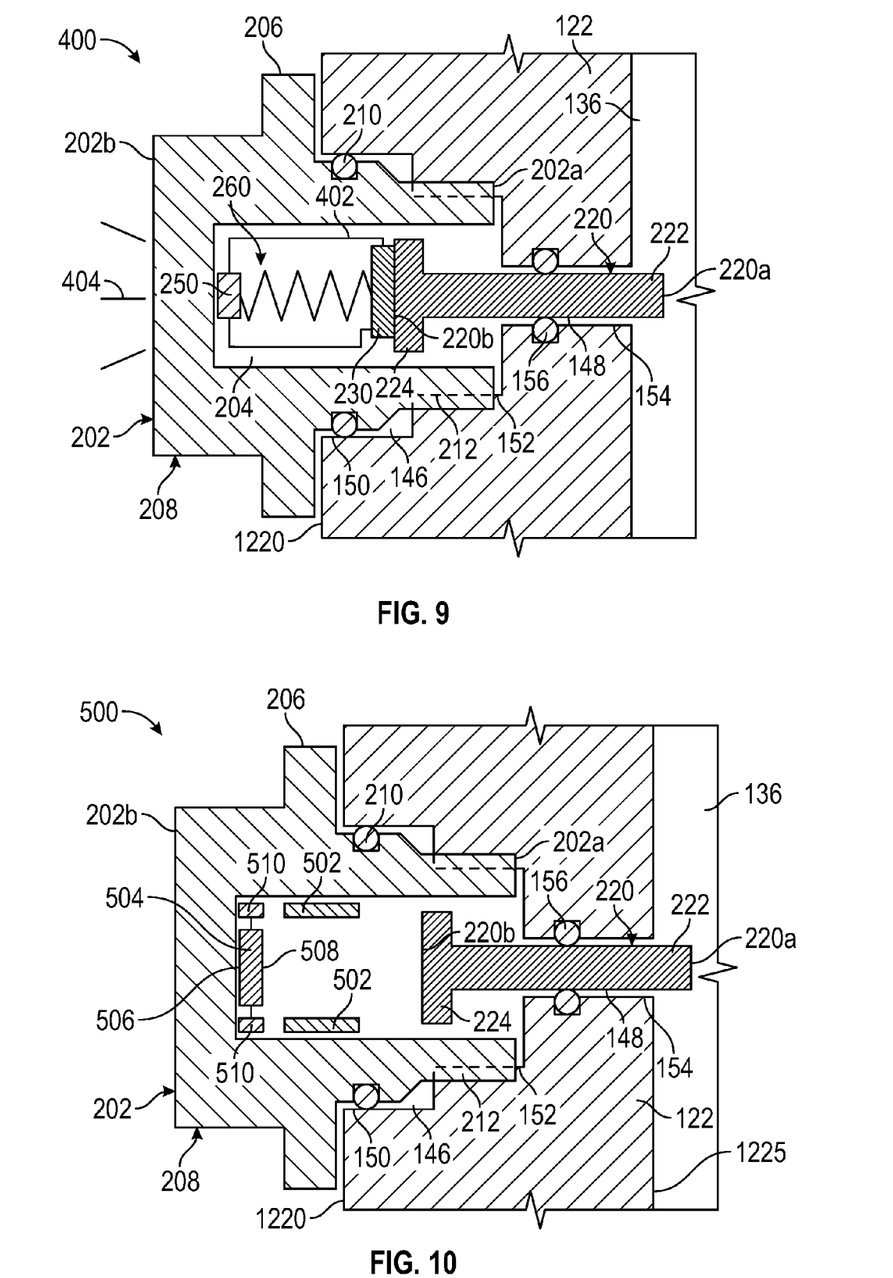
FIG. 9 is a schematic cross-sectional view of the position indicator assembly of FIG. 6, shown in a second position.
FIG. 10 is a schematic cross-sectional view of another embodiment of a position indicator assembly of the ram assembly of FIG. 4 in accordance with principles disclosed herein.

Referring to FIGS. 8 and 9, another embodiment of a position indicator assembly 400 for use with ram BOP 100 is shown. Position indicator assembly 400 includes features similar to position indicator assembly 200, and shared features are numbered similarly. In this embodiment, position indicator assembly includes a connector or circuit 402 that is disconnected between power supply 230 and visual indicator 250 when piston 116 is in the open position, as shown in FIG. 8. Position indicator assembly 400 is further configured such that the circuit 402 is connected or "completed" between power supply 230 and visual indicator 250 when piston 116 is in the closed position, causing visual indicator 250 to emit a visual indication or illumination 404. Thus, in this embodiment, the circuit 402 is connected between power supply 230 and visual indicator 250 when biasing member 260 has allowed to fully extend in response to piston 116 being displaced inwardly into the closed position, restricting flow through central bore 108 (shown in FIG. 2) of ram BOP 100.

Referring to FIG. 10, another embodiment of a position indicator assembly 500 for use with ram BOP 100 is shown. Position indicator assembly 500 includes features similar to position indicator assembly 200, and shared features are numbered similarly. As discussed above, the visual indicator of the position indicator assembly may comprise a mechanical vision indicator. In this embodiment, position indicator assembly 500 comprises a first pair of gears or geared tracks 502, a visual indicator or placard 504, and a second pair of gears 510 coupled to placard 504. In this embodiment, placard 504 has a first side or surface 506 labeled "CLOSED" and a second side or surface 508 labeled "OPEN" disposed opposite of first side 506. In FIG. 10 piston 116 is disposed in the closed position and correspondingly the first side 506 is displaced outwardly and thereby visually indicated, while the second side 508 is hidden from view.

Placard 504 may be rotated such that second side 508 faces outwardly (i.e., faces outer end 202b of housing 202) while first side 506 faces inwardly in response to piston 116 being displaced from the closed position to the open position. Specifically, as piston 116 is displaced towards the open position, piston 116 engages indicator piston 220, causing outer end 220b of indicator piston 220 to engage and thereby physically displace first gears 502 towards outer end 202b of housing 202. As first gears 502 are displaced towards outer end 202b, first gears 502 engage second gears 510, which are coupled to placard 506, causing second gears 510 to rotate, thereby rotating placard 506 until second end 508 faces outer end 202b of housing 202, thereby visually indicating "OPEN".

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A position indicator for a subsea component of a well system, comprising:
 a visual indicator comprising an illuminator;
 an electrical connector selectably connected between the visual indicator and a power supply;
 an actuator configured to connect the visual indicator with the power supply and complete a circuit between the visual indicator and the power supply when a moveable member of the subsea component is disposed in a first position; and
 a biasing member extending between the visual indicator and the power supply, wherein the biasing member is configured to bias the position of the power supply into a position disconnected from the visual indicator;

wherein the illuminator is configured to emit a first subsea illumination when the moveable member is disposed in the first position.

2. The position indicator of claim 1, wherein the actuator is configured to disconnect the power supply from the visual indicator when the moveable member is disposed in a second position distal the first position.

3. The position indicator of claim 1, wherein the visual indicator and the actuator are disposed in a housing coupled to the subsea component.

4. The position indicator of claim 1, wherein the actuator comprises a piston that engages the moveable member and the power supply when the moveable member is in the first position to connect the power supply to the visual indicator.

5. The position indicator of claim 4, wherein the piston compresses the biasing member when the moveable member is in the first position to connect the power supply to the visual indicator.

6. The position indicator of claim 1, wherein the subsea component comprises a blowout preventer, and the moveable member comprises a piston disposed in a cylinder of the blowout preventer.

7. A blowout preventer, comprising:
a cylinder including a closure piston disposed slidably therein;
a closure member coupled to the closure piston, wherein the closure member is configured to allow for fluid communication through a bore of the blowout preventer when the closure piston is disposed in a first position, and to seal the bore when the closure piston is disposed in a second position distal the first position; and
a position indicator coupled to the cylinder, comprising:
a visual indicator; and
an actuator configured to actuate the visual indicator when the closure piston is in the first position such that the visual indicator provides a first visual indication;
wherein the closure piston is in engagement with the actuator when the closure piston is in the first position;
wherein the closure piston is spaced from the actuator when the closure piston is in the second position;
wherein the actuator is configured to restrict a power supply from supplying the visual indicator with power when the closure piston is disposed in the second position.

8. The blowout preventer of claim 7, wherein the first visual indication comprises a first illumination emitted from the visual indicator.

9. The blowout preventer of claim 7, further comprising a biasing member extending between the visual indicator and the power supply, wherein the biasing member is configured to bias the position of the power supply such that the power supply is prevented from supplying power to the visual indicator.

10. The blowout preventer of claim 9, wherein the actuator comprises an indicator piston that engages the closure piston when the closure piston is in the first position to connect the power supply to the visual indicator.

11. The blowout preventer of claim 7, wherein the visual indicator comprises a mechanical display.

12. The blowout preventer of claim 7, wherein the closure piston is disengaged from the actuator when the closure piston is in the second position.

13. A method of indicating a position of a closure member of a blowout preventer, comprising:
displacing the closure member relative to an actuator configured to actuate a visual indicator in response to displacement of the closure member;
providing a first subsea illumination from the visual indicator when the closure member is disposed in a first position;
displacing the closure member from the first position;
using the actuator to restrict a power supply from supplying the visual indicator with power in response to the closure member being displaced from the first position; and
ceasing the first subsea illumination from the visual indicator in response to restricting the power supply from supplying the visual indicator with power.

14. The method of claim 13, further comprising detecting the first subsea illumination from the visual indicator using a remotely operated underwater vehicle.

* * * * *